United States Patent [19]
Ritt et al.

[11] Patent Number: 4,516,998
[45] Date of Patent: May 14, 1985

[54] METHOD OF MAKING TUBULAR VIALS AND AMPULES

[75] Inventors: Hans-Georg Ritt, Budenheim; Hartmut Luneberg, Mitterteich; Reinhard Mannl, Mitterteich; Alfred Grillmeier, Mitterteich, all of Fed. Rep. of Germany

[73] Assignee: Schott-Ruhrglas GmbH, Bayreuth, Fed. Rep. of Germany

[21] Appl. No.: 552,321

[22] Filed: Nov. 16, 1983

[30] Foreign Application Priority Data

Nov. 16, 1982 [DE] Fed. Rep. of Germany ....... 3242326

[51] Int. Cl.$^3$ ............................................. C03B 23/12
[52] U.S. Cl. ........................................ 65/108; 65/110; 65/292; 65/295
[58] Field of Search ................... 65/108, 110, 292, 295

[56] References Cited

U.S. PATENT DOCUMENTS 3,375,948  4/1968  Creevy et al. .................... 65/110 X
3,923,487  12/1975  Lewis .................................. 65/110

FOREIGN PATENT DOCUMENTS 867291  2/1953  Fed. Rep. of Germany ........ 65/108
857101  3/1958  United Kingdom .

Primary Examiner—Robert Lindsay
Attorney, Agent, or Firm—Littlepage & Webner

[57] ABSTRACT

The present invention relates to a new method of making tubular vials and ampules from glass tubing. The method according to this invention is essentially characterized in that the glass tubing used is closed at both ends and has a dot-shaped opening close to one of the sealed ends. The opening can be sealed by a film to prevent impurities from entering the glass tubing. Throughout the operational process in the production of vials and ampules, a slight excess pressure exists in the glass tubing by applying heat, which further prevents impurities from entering the glass tubing.

10 Claims, 4 Drawing Figures

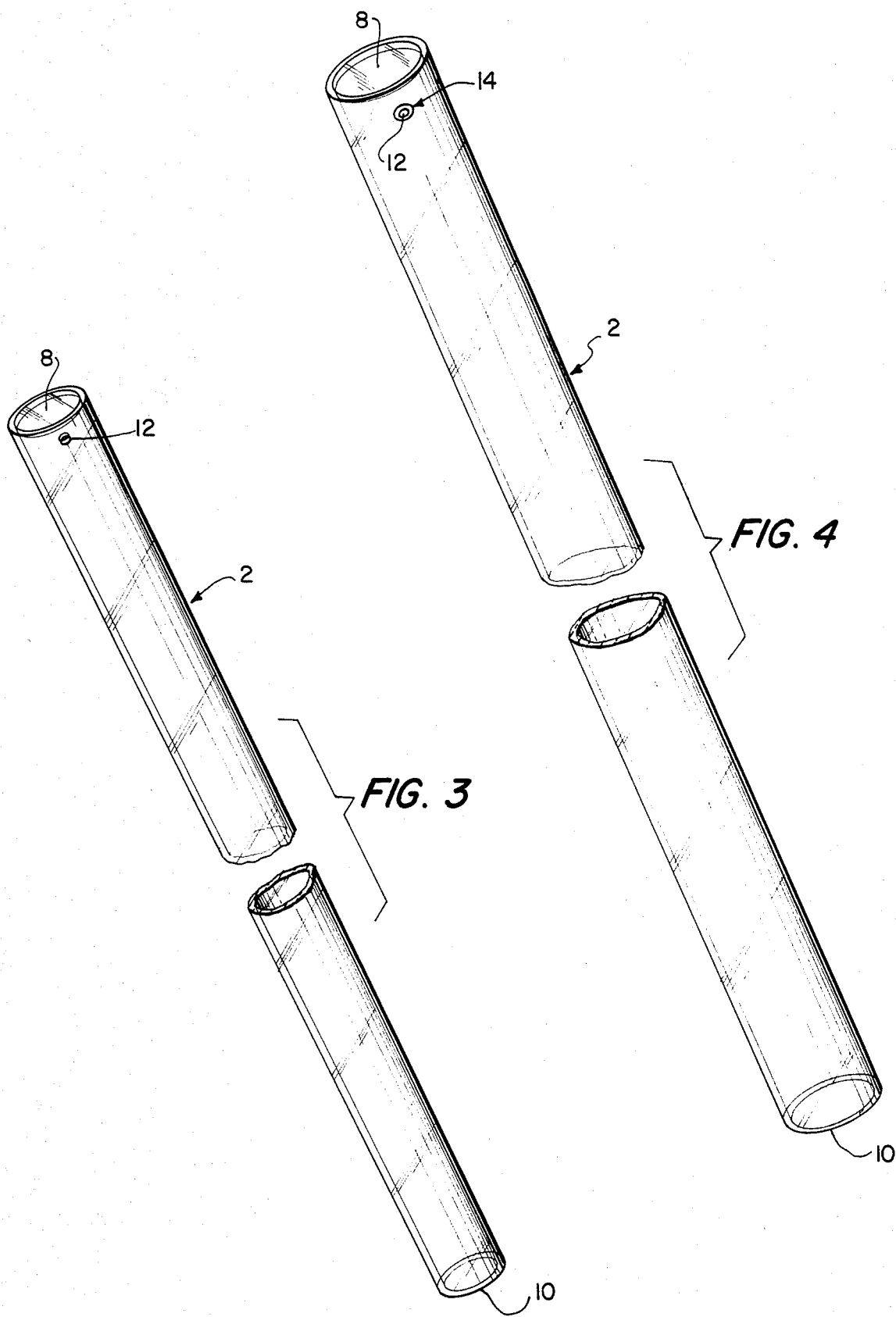

METHOD OF MAKING TUBULAR VIALS AND AMPULES

FIELD OF THE INVENTION

Glass manufacturing process, glass preform treating, with severing or perforating, by or with flame.

OBJECTS

Ampules and vials are primarily made from glass tubing. The glass tubing is produced continuously in that the molten glass is fed onto a rotating mandrel on a slightly inclined tube drawing machine and compressed air is blown into the thus formed flexible tube by way of a hollow shaft, which supports the mandrel. The tube is drawn and transported by way of a conveyor to a cutting device, where tubular lengths of approximately 1.50 m are cut off and allowed to roll off to the side. Ampules and vials are produced from such lengths of tube.

Vials are primarily produced on carousel machines with the tubes vertically positioned, operating either intermittently or continuously, or, less frequently on horizontal machines.

On the automatic carousel machines, the glass tube is initially separated thermally at the lower end. This results in the forming of two closed ends, the lower one of which is discarded along with the short end piece of the tube, while the upper one is opened up again with a jet flame and a mouth for the vial is formed there. Following that, the tube is constricted sharply at a point along its vertical height corresponding to the length of a vial and is melted thoroughly, whereby closed ends are produced on the now separated first vial and the remaining part of the tube. By means of a jet flame, the closed end on the remaining part of the tube is opened up, whereupon the above described operational steps are repeated on the remaining glass tube.

Ampules are also predominantly produced on carousel machines with the tubes in a vertical position, whereby the first ampule is also formed on the lower end of the tube. In contrast to the vials, however, the ampule is produced with its opening on the top, that is the bottom end of the ampule develops on the lower end of the glass tube. Initially, however, the tube is softened at a point along its vertical height corresponding to the ampule length, and drawn out to form the spike of the ampule. Shoulder and bulb are formed at this point, and at the end of the spike, the tube is melted through, forming a closed end on the remaining tube. The above described operational steps are then repeated on the remaining glass tube.

These known production methods for vials and ampules have grave disadvantages. A particularly serious problem, especially in the vial production, is that it is often unavoidable that combustion gases, oil vapors and light, volatile glass components are blown into the interior of the glass tube during the opening of the closed end with a jet flame and deposited there.

It is the object of the present invention, to eliminate the described disadvantages in vial and ampule production. In particular, the object of the invention is to provide a method, which produces vials and ampules that are clean enough to be filled with pharmaceutical products without prior cleaning. The method according to the patent claims has achieved this object.

Thus, the invention is based on a novel method of producing vials or ampules from a prepared length of tube, in such a way that during the course of the operational steps, no impurities can get inside the newly formed glass container or the remaining length of glass tube.

This is achieved due to the fact that with use of the tubes prepared according to the invention, a slight excess pressure exists in the tube throughout the operational process, which prevents any impurities from entering.

The invention is hereinafter more particularly described in the following specification and drawings; in which FIG. 1 is a side view of part of an endless glass tubing showing a zone of softening by the application of heat in the making of a closed end tube;

FIG. 3 is a diagrammatic representation of a tube sealed at both ends showing the dot-shaped opening close to one of the sealed ends;

FIG. 4 is a diagrammatic representation of the tube in FIG. 3 showing the opening sealed by a film.

PRODUCTION OF TUBE LENGTHS TO BE USED WITH THE METHOD ACCORDING TO THE INVENTION

Figure 1:
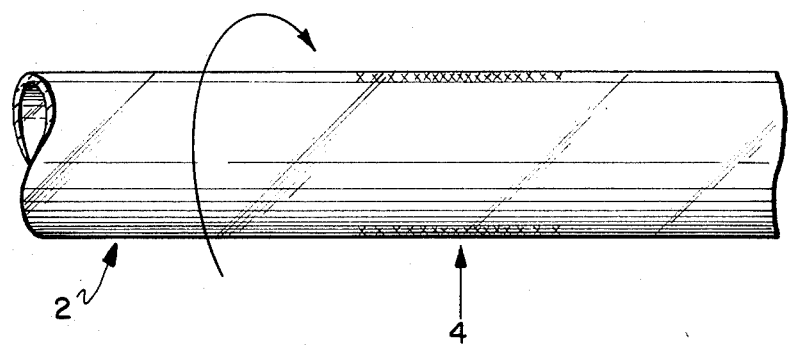
Figure 2:
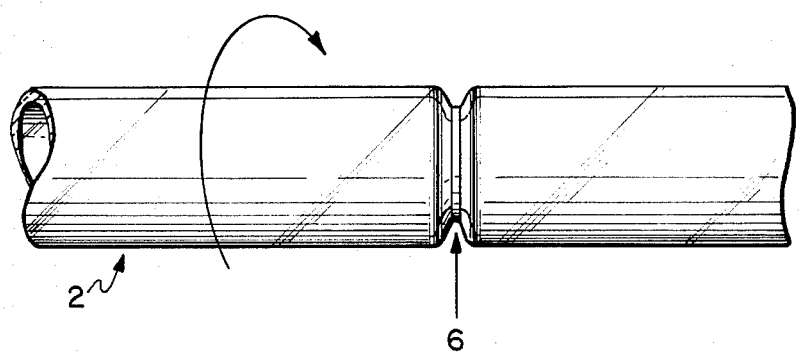
FIG. 2 is a side view of part of the endless glass tubing showing the formation of a closed tube section by means of the application of an axially directed force to the softened zone.

Referring to FIGS. 1-4, the tube lengths 2 severed from continuous glass tubing stock (for example by thermal shock) are softened at both ends thereof (successively or simultaneously) as at 4 by means of burners (not shown) and the softened ends are drawn out by means of an axially directed force until the tube collapses and a closed tube section is obtained 6. This causes any glass slivers or splinters which may be adhering to the tube ends to sinter on the material so that they are also drawn off.

After the length of tube has been closed off on both ends 8,10 or, preferably, after one end 8 of the open tube has been closed off, a dot-shaped opening 12 is formed on this end with a jet flame (not shown). This dot-shaped opening can be formed directly on the closed end. However, the opening is preferably formed at a point on the tube side, near the closed end 8. The dot-shaped opening 12 preferably has a diameter of between 0.5 and 1.5 mm, so that the opening generally amounts to considerably less than 1% of the open area existing on a standard tube (open on both ends).

In a modified version, shown in FIG. 4, this dot-shaped opening 12 can be sealed off again by a film 14. This film 14 should be composed of material that will soften with moderate heating and then burst open with low pressure, or it should consist of material which burns without residue, such as filter paper. It is preferable that this film is made from a plastic foil, e.g. by putting the still hot glass tube in contact with a suitable foil in such a way that the foil will stick to the tube in the area of the dot-shaped opening 12 and thus seal off this opening with a thin film. It is also possible to immediately reseal the dot-shaped opening with thin glass pellicle.

The lengths of glass tube prepared in such a way are kept clean to a degree that thus far has not been possible with standard tubes for ampule and vial production. If the lengths of tube prepared according to the invention are also piled up into tube stacks, according to a method as described in German Patent Specification No. 27 29 266, whereby they are placed tightly beside and above each other and are enclosed by a cover made of flexible material (sealed), they are doubly protected as compared to traditional glass tubes. When they reach the vial and/or ampule producer, who, again according to the invention at hand, produces the vials and ampules in such a way that they are much cleaner as compared to those produced with the traditional production methods.

It is preferable if at least one of the two closed-off tube ends is planar. This will possibly facilitate and/or simplify later production methods.

PRODUCTION OF AMPULES

The tube prepared according to the invention is vertically positioned on a carousel machine. The dot-shaped opening and/or the opening sealed by a film is on the top. In the latter case, this area is heated, e.g. by a flicker burner, which causes the film to soften such that during the subsequent procedural step, it will burst open due to the accumulating excess pressure inside and/or will burn without residue if the film consists of a combustible material such as paper. The ampules are then produced according to standard techniques, starting at the lower end as follows:

At a distance from the lower end corresponding to the ampule length, the tube is softened with a suitable burner and the ampule shape (spiked end, collar and, if necessary, bulb) produced, whereby the softened film will burst open due to the accumulating excess pressure inside.

Above the spiked end, the tube is now melted off. This creates a closed end at the spike for the ampule and a closed end on the remaining tube. On the remaining tube, the above described operational steps are repeated.

When producing drinking ampules, which have spikes on both ends, two spikes are formed at the places at which the burners are directed.

PRODUCTION OF VIALS

The tube prepared according to the invention is mounted on the production machine in such a way that the dot-shaped opening and/or the opening sealed off by a film is on the bottom. At the upper end, the length of tube is heated moderately. At a point above the dot-shaped opening and/or the opening resealed with a film, the tube is thermally separated whereby a closed end forms on the lower tube end, which is discarded, as well as on the remaining tube which, however, bursts open again immediately due to the excess pressure that accumulates. At this point, the mouth for the first vial is formed. At a distance from this spot and corresponding to the length of the vial, the tube is again separated thermally, whereby a closed end for the first vial forms below and another closed end forms above, which, due to the newly accumulating excess pressure inside will burst open again immediately. With the shaping of the vial mouth at this spot, the above described technique is repeated.

The method according to the claims can also be used for ampule and vial production methods other than the one explained in the examples.

We claim:

1. Production method for vials whereby vials are produced from vertically mounted glass tubes in a production machine, said method comprising:
   vertically mounting a glass tube, which has both ends sealed, in a production machine,
   heating a portion of the sides of the tube adjacent to the top portion of the tube,
   forming a bottom portion of a vial in the vicinity of said heated portion, whereby excess pressure develops within the tube below said bottom portion causing said bottom portion to burst open immediately forming a mouth portion for a vial,
   separating said top portion of the tube above said mouth portion,
   separating said vial from the tube at a distance from said mouth portion corresponding to the length of said vial whereby the bottom portion of said vial and a second bottom portion for the remaining length of tube are formed simultaneously, and whereby said second bottom portion bursts open immediately as a result of excess pressure accumulated within said tube below said second bottom portion thus forming a mouth portion for said second vial, and
   repeating said steps of heating, forming and separating until the glass tube has been used.

2. The production method of claim 1 wherein the glass tube has a dot-shaped opening adjacent the sealed bottom end of the tube.

3. The production method of claim 1 wherein the glass tube has a dot-shaped opening in the sealed bottom end of the tube.

4. The production method of claim 2 wherein the dot-shaped opening has been resealed by a film.

5. The production method of claim 3 wherein the dot-shaped opening has been resealed by a film.

6. Production method for ampules whereby ampules are produced from vertically mounted glass tubes in a production machine, said method comprising:
   vertically mounting a glass tube, which has both ends sealed, in a production machine,
   heating a portion of the sides of the tube at a distance from the lower end of the tube corresponding to the length of the ampule to soften the sides of the tube,
   forming the softened sides of the tube into a neck shape for the ampule whereby excess pressure develops in the tube and the tube bursts open at the top,
   melting off the ampule above the neck and forming a new closed end on the tube,
   repeating said steps of heating, forming and melting until the glass tube has been used.

7. The production method of claim 6 wherein the glass tube has a dot-shaped opening adjacent the sealed top end of the tube.

8. The production method of claim 6 wherein the glass tube has a dot-shaped opening in the sealed top end of the tube.

9. The production method of claim 7 wherein the dot-shaped opening has been resealed by a film.

10. The production method of claim 8 wherein the dot-shaped opening has been resealed by a film.

* * * * *